United States Patent [19]

Su

[11] Patent Number: 5,801,615

[45] Date of Patent: Sep. 1, 1998

[54] MOTOR VEHICLE SECURITY SYSTEM

[76] Inventor: Yuan Tai Su, Fl.4, No. 6, Alley 6, Lane 105, Yen Ho Rd., Tu Cheng City, Taipei Hsien, Taiwan

[21] Appl. No.: 946,220

[22] Filed: Oct. 7, 1997

[51] Int. Cl.⁶ .................................................. G08B 17/10
[52] U.S. Cl. .......................... 340/425.5; 340/425.5; 340/426; 340/539; 340/825.31; 307/10.2
[58] Field of Search ........................ 340/425.5, 426, 340/428, 430, 825.31, 541, 539, 520, 545; 307/10.2; 180/287

[56] References Cited

U.S. PATENT DOCUMENTS

| | | | |
|---|---|---|---|
| 4,794,368 | 12/1988 | Grossheim et al. | 340/539 |
| 4,888,575 | 12/1989 | De Vaulx | 340/426 |
| 4,897,644 | 1/1990 | Hirano | 340/825.31 |
| 4,910,493 | 3/1990 | Chambers et al. | 340/426 |
| 5,280,267 | 1/1994 | Reggiani | 340/426 |
| 5,349,329 | 9/1994 | Smith | 340/539 |
| 5,412,371 | 5/1995 | Kaplan | 340/426 |
| 5,469,151 | 11/1995 | Lavelle et al. | 340/825.36 |
| 5,563,453 | 10/1996 | Nyfelt | 307/10.2 |
| 5,568,120 | 10/1996 | LeMense et al. | 340/426 |
| 5,635,916 | 6/1997 | Bucholtz et al. | 340/825.31 |
| 5,635,923 | 6/1997 | Steele et al. | 340/905 |
| 5,648,754 | 7/1997 | Hwang | 340/426 |
| 5,673,017 | 9/1997 | Dery et al. | 340/426 |
| 5,684,454 | 11/1997 | Nishioka et al. | 340/426 |
| 5,699,685 | 12/1997 | Jahrsetz et al. | 307/10.2 |
| 5,708,307 | 1/1998 | Iijima et al. | 307/10.5 |

*Primary Examiner*—Jeffery A. Hofsass
*Assistant Examiner*—Toan N. Pham
*Attorney, Agent, or Firm*—Beveridge, DeGrandi, Weilacher & Young, LLP

[57] ABSTRACT

A motor vehicle security system including a receiver unit, an alarm unit, and a transmitter unit respectively mounted in a motor vehicle and connected to a car battery of the motor vehicle, the alarm unit and the transmitter unit are respectively connected to the receiver unit, the receiver unit being controlled by a remote controller to provide a check code to the alarm unit and the transmitter unit, the receiver unit been stopped from providing the check code when a door of the motor vehicle is opened by force, the alarm unit and the transmitter unit having a respective self-provided battery power supply and being triggered to produce an audio alarm signal and a radio alarm message respectively when they receive no check code from the receiver unit, the radio alarm message being receivable to car radios.

5 Claims, 6 Drawing Sheets

5,801,615

MOTOR VEHICLE SECURITY SYSTEM

BACKGROUND OF THE INVENTION

The present invention relates to a motor vehicle security system, and more particularly to such a motor vehicle security system which provides an audio alarm and a radio alarm message when a car door of the motor vehicle in which the motor vehicle security system is installed is opened by violence.

A variety of motor vehicle security systems have been disclosed for use in motor vehicles to protect against burglars, and have appeared on the market. FIG. 1 shows a motor vehicle security system according to the prior art. This security system comprises a receiver unit 10 connected to the car battery 12 of the motor vehicle and adapted to detect the main car door switch 13 and auxiliary car door switch 14 of the motor vehicle, and a speaker 11 connected to the receiver unit 10, and a remote controller (not shown) controlled to turn the receiver unit 10 to an alert status or to disarm it. When the main car door switch 13 or the auxiliary car door switch 14 are broken by an intruder, the receiver unit 10 immediately provides an audio alarm signal through the speaker 11. This structure of motor vehicle security system is not satisfactory in function. When the circuit between the speaker 11 and the receiver unit 10 is broken, the audio alarm signal is suddenly stopped.

SUMMARY OF THE INVENTION

According to one aspect of the present invention, the motor vehicle security system comprises a receiver unit, an alarm unit, and a transmitter unit respectively mounted in a motor vehicle and connected to a car battery of the motor vehicle, the alarm unit and the transmitter unit are respectively connected to the receiver unit, the receiver unit being controlled by a remote controller to provide a check code to the alarm unit and the transmitter unit, the receiver unit been stopped from providing the check code when a door of the motor vehicle is opened by force, the alarm unit and the transmitter unit having a respective self-provided battery power supply and being triggered to produce an audio alarm signal and a radio alarm message respectively when they receive no check code from the receiver unit, the radio alarm message being receivable to car radios. According to another aspect of the present invention, the alarm unit and the transmitter unit are separately provided so that both unit can be simultaneously installed or optionally installed as desired. According to still another aspect of the present invention, the alarm unit and the transmitter unit are provided with a respective rechargeable battery, so that the alarm unit and the transmitter unit can still function well when the car battery of the motor vehicle is stopped from providing power supply to the alarm unit and the transmitter unit.

DETAILED DESCRIPTION OF THE PREFERRED EMBODIMENT

Figure 1:
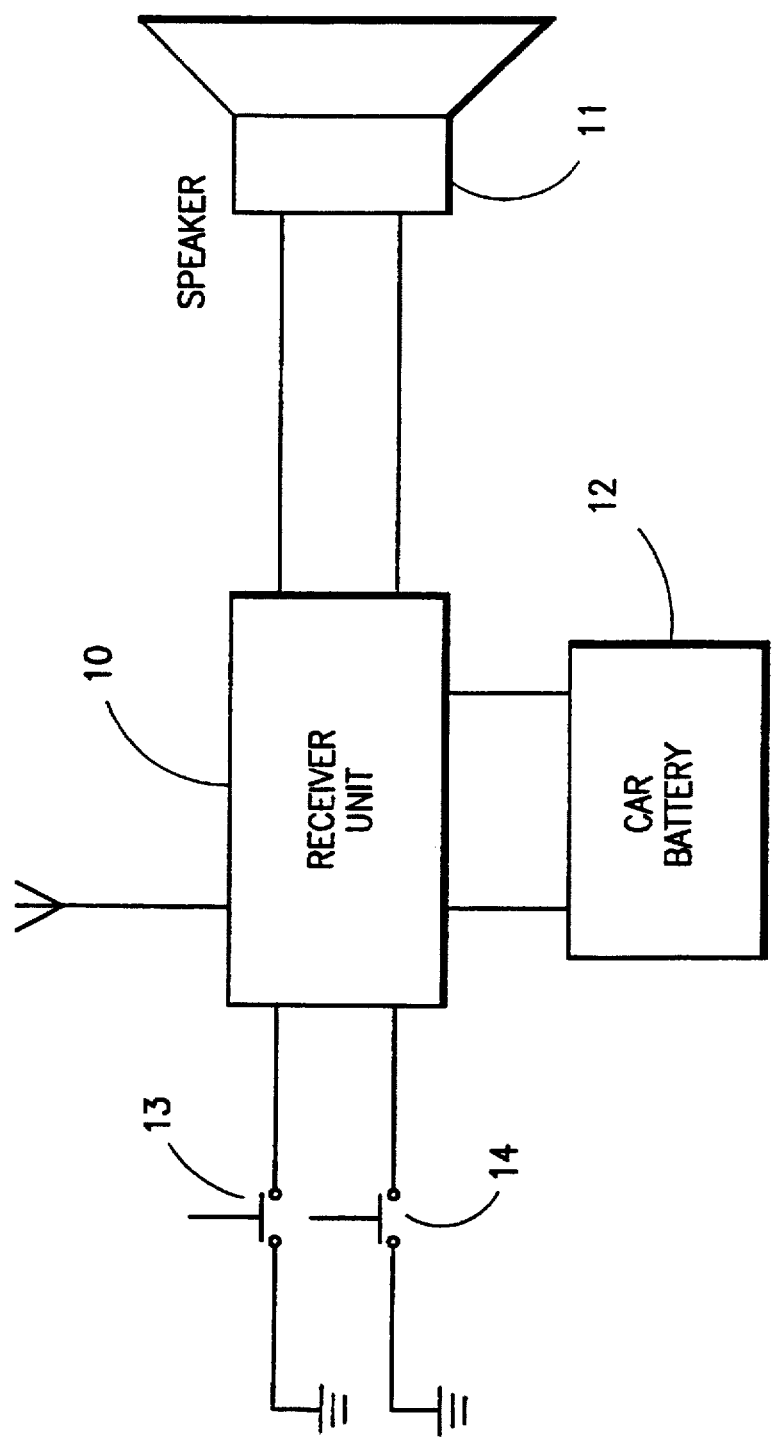
FIG. 1 is a circuit block diagram of a motor vehicle security system according to the prior art.
Figure 2:
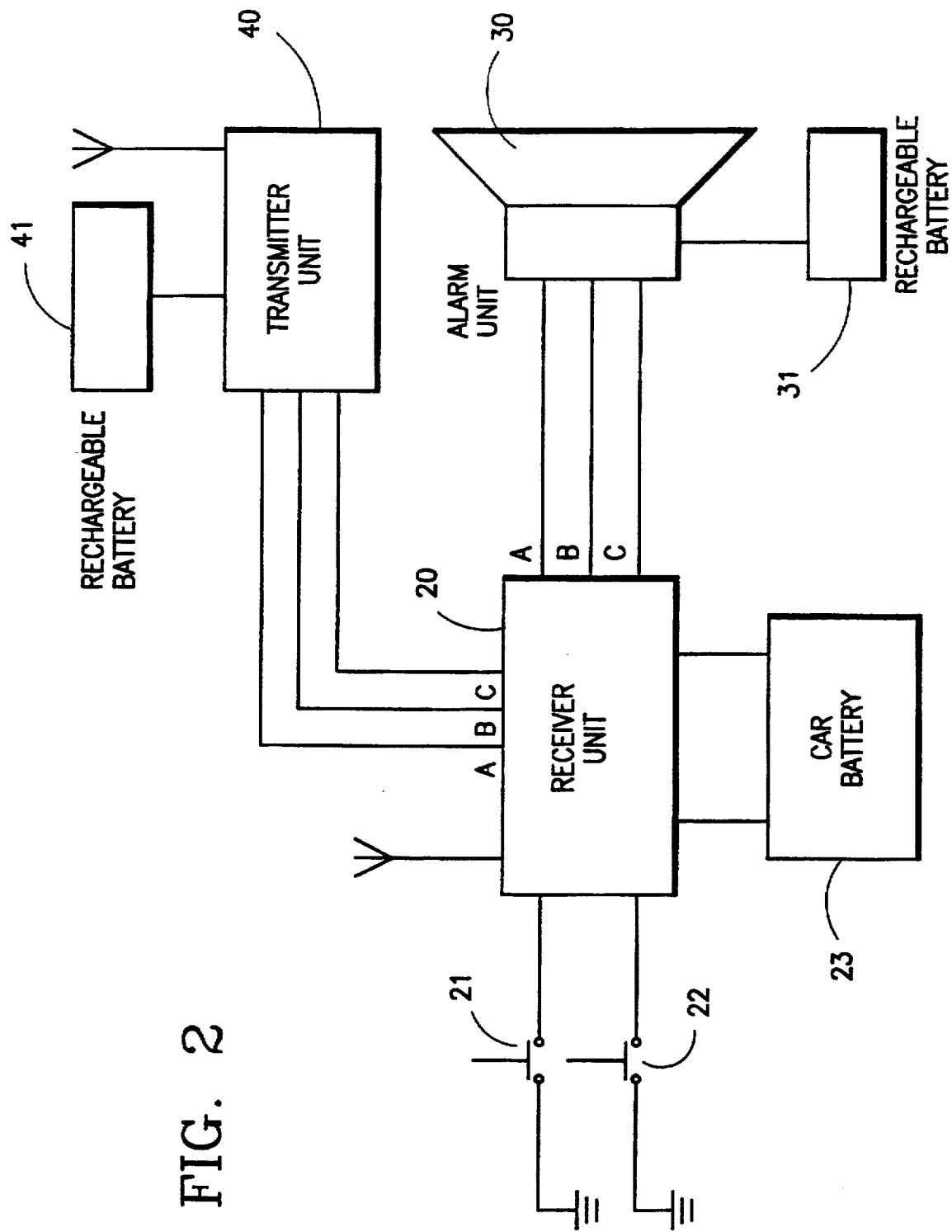
FIG. 2 is a circuit block diagram of a motor vehicle security system according to the present invention.

Referring to FIG. 2, a motor vehicle security system in accordance with the present invention is generally comprised of a receiver unit 20, a burglar alarm unit 30, and a transmitter unit 40. The receiver unit 20 is coupled to a door switch 21 and auxiliary switch 22 of a car to detect an abnormal opening of the car doors. The receiver unit 20 can be controlled by a remote controller (not shown) to arm or to disarm. The working voltage of the receiver unit 20 is obtained from the car battery 23. The receiver unit 20 is respectively connected to the transmitter unit 40 and the alarm unit 30 by a power line A, a control line B and an earth line C. Independent rechargeable battery 31;41 are installed to provide electricity to the alarm unit 30 and the transmitter unit 40 respectively. When the car works normally, the car battery 23 charges the rechargeable battery 31;41. When the car is stolen and the power of the car battery 23 is low, the rechargeable battery 31;41 provide the necessary working voltage to the alarm unit 30 and the transmitter unit 40, enabling the alarm unit 30 and the transmitter unit 40 to function well.

Figure 3:
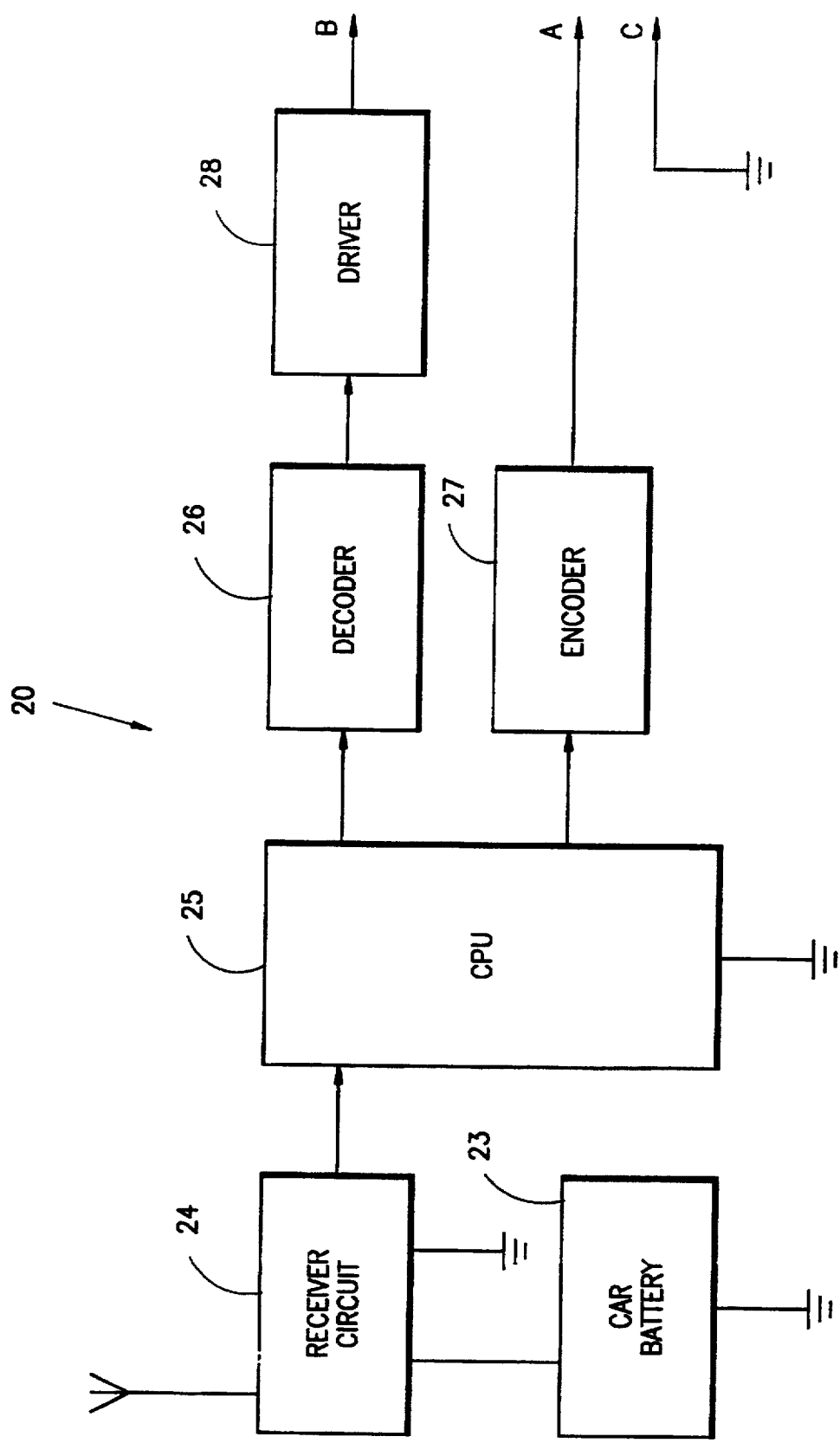
FIG. 3 is a circuit block diagram of the receiver unit of the motor vehicle security system shown in FIG. 2.

Referring to FIG. 3, the receiver unit 20 comprises a receiver circuit 24, a CPU 25, a decoder 26, an encoder 27, and a driver 28. The receiver circuit 24 is connected to the car battery 23, and adapted to receive the control signal of the remote controller, permitting the received control signal to be transmitted to the CPU 25 for processing. The CPU 25 is adapted to transmit the control signal from the receiver circuit 24 to the decoder 26, and to provide a check code to the encoder 27. The decoder 26 is adapted to decode the control signal of the remote controller and then to feed back the decoded control signal to the CPU 25, causing the CPU 25 to control the operation of the car door switch 21 and auxiliary switch 22 subject to the natural of the decoded control signal. The decoder 26 provides a signal to the driver 28 when it receives an error control signal or receives no signal within a predetermined length of time. The encoder 27 is adapted to encode the check code provided by the CPU 25, and to transmit the encoded check code to the alarm unit 30 and the transmitter unit 40 (i.e., the power line A). The driver 28 is controlled by the decoder 26 to output control power to the alarm unit 30 and the transmitter unit 40 (i.e., the control line B).

Figure 4:
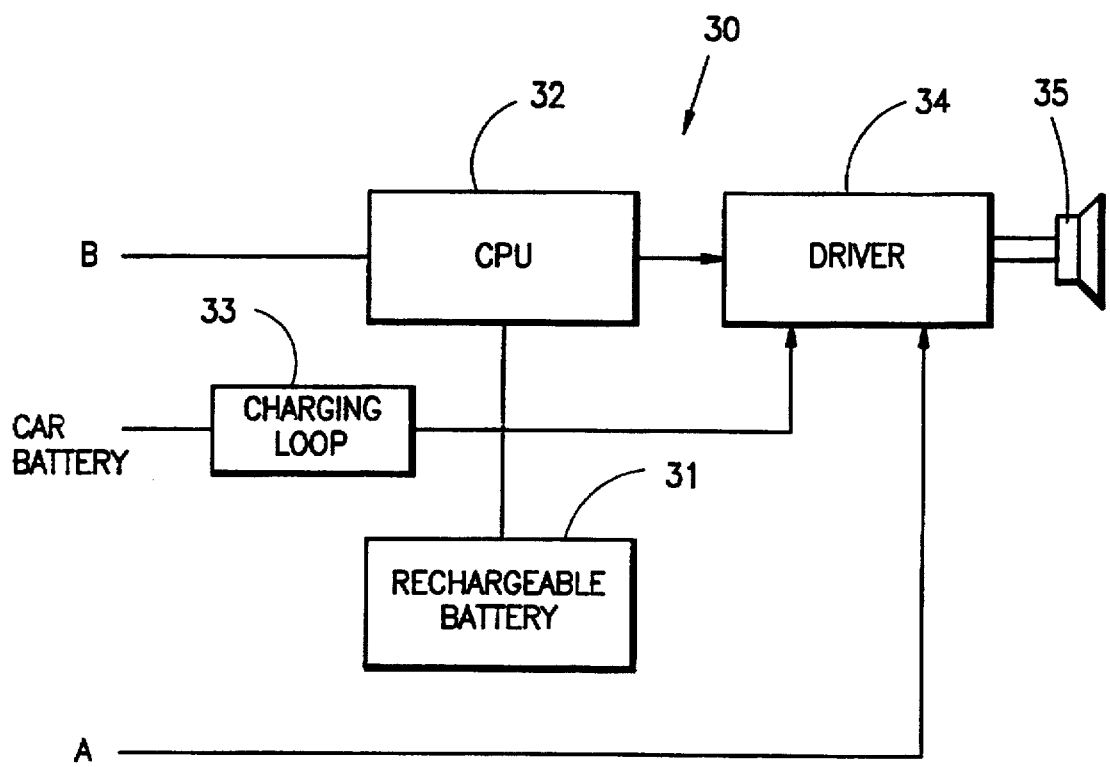
FIG. 4 is a circuit block diagram of the alarm unit of the motor vehicle security system shown in FIG. 2.
Figure 5:
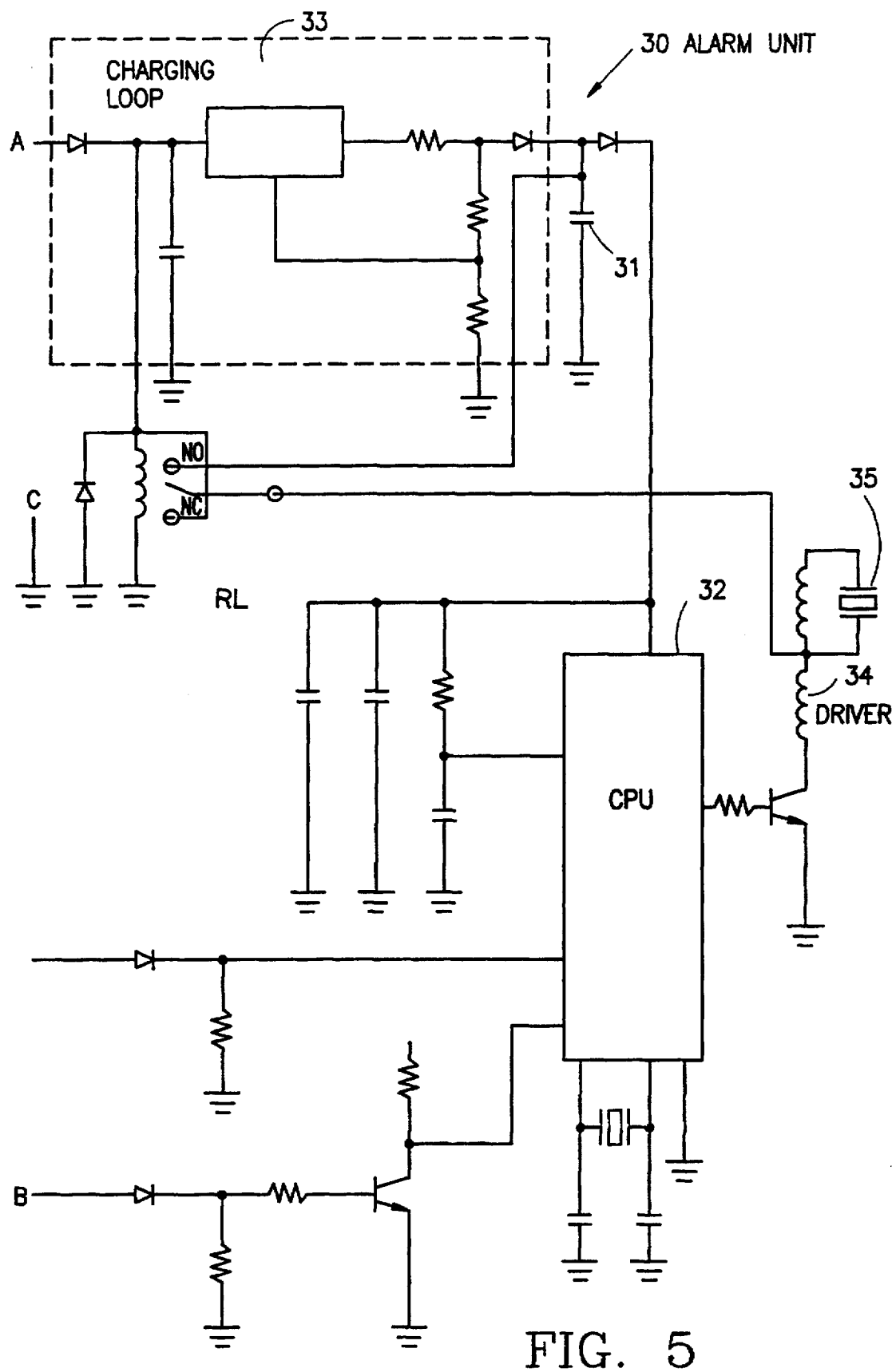
FIG. 5 is a circuit diagram of the alarm unit shown in FIG. 4.

Referring to FIGS. 4 and 5, the alarm unit 30 comprises a CPU 32 adapted to detect the check code of the receiver unit 20 transmitted through the control line B and to provide a control signal to a driver upon an interruption of the transmission of the check code, a rechargeable battery 31 (namely, the rechargeable battery 31 shown in FIG. 2) adapted to provide the necessary working voltage when the car battery 23 is unable to function well, a charging loop 33 adapted to receive the power of the car battery 23 through the control power line A of the receiver unit 20, a speaker 35, and a driver 34 controlled by the CPU 32 to produce an audio alarm signal through the speaker 35. The charging loop 33 comprises a relay RL. When the car battery 23 functions well, the relay RL is at a NC (normal close) status, enabling the car battery 23 to directly charge the rechargeable battery 31 and to provide the necessary working power to the driver 34. On the contrary, when the power of the car battery 23 is low, the relay RL is turned from the NC status to a NO (normal open) status, permitting the rechargeable battery 31 to provide the necessary working voltage to the driver 34.

Figure 6:
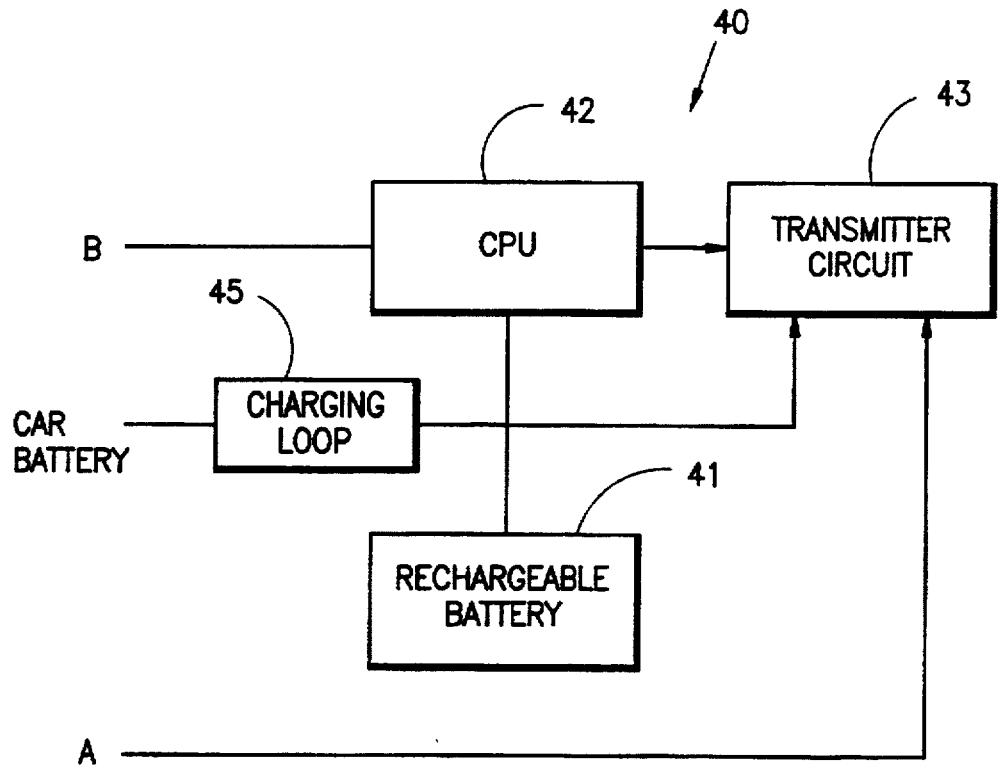
FIG. 6 is a circuit block diagram of the transmitter unit of the motor vehicle security system shown in FIG. 2.
Figure 7:
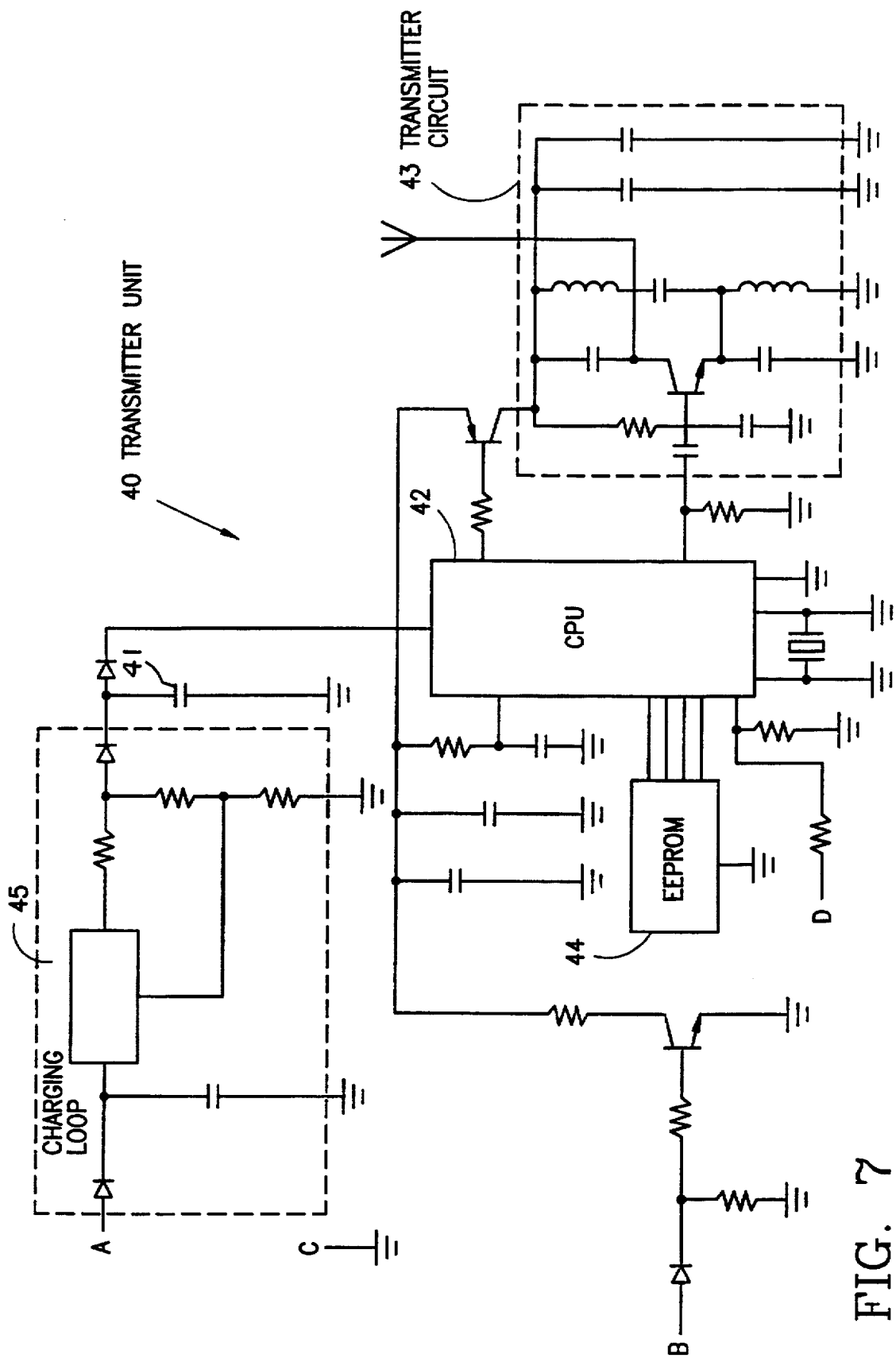
FIG. 7 is a circuit diagram of the transmitter unit shown in FIG. 6.

Referring to FIGS. 6 and 7, the transmitter unit 40 comprises a CPU 42 adapted to detect the check code of the receiver unit 20 transmitted through the control line B of the receiver unit 20 and to provide a control signal to a driver upon an interruption of the transmission of the check code, a rechargeable battery 41 (namely, the rechargeable battery 41 shown in FIG. 2) adapted to provide the necessary working voltage when the car battery 23 is unable to function well, a transmitter circuit 43 controlled by the CPU 42 to provide a modulated FM or AM radio signal, and a charging loop 45 adapted to receive the power of the car battery 23 through the control power line A of the receiver unit 20 and to provide the necessary working voltage to the transmitter circuit 43 when the power of the car battery 23 is low. The CPU 42 comprises an EEPROM (electronically erasable programmable read only memory) 44, and a programming line D through which a speech message including car number, SOS signal, etc., is programmed in the EEPROM 44. When the CPU 42 receives no check code from the receiver unit 20, it immediately fetches the speech message from the EEPROM 44 and then sends it to the transmitter circuit 43, permitting the speech message to be modulated into a FM (frequency modulation) or AM (amplitude modulation) radio signal for transmitting into the air. When the security system is installed in the car and the car is opened by violence, the CPU 25 of the receiver unit 20 immediately detects the situation and stops sending the check code. When the alarm unit 30 and the transmitter unit 40 receive no check signal from the receiver unit 20, the speaker 35 of the alarm unit 30 is driven to produce an audio alarm, and at the same time the transmitter circuit 43 of the transmitter unit 40 is driven to send the programmed speech message into the air by radio. If the control power line A and control line B of the receiver unit 20 are broken by the burglar, the rechargeable battery 31;41 keep providing the alarm unit 30 and the transmitter unit 40 with the necessary working voltage, and therefore the speaker 35 and the transmitter circuit 43 keep working. Even if the burglar connects the control line B back, the CPU 25 does no longer provide the check code, therefore the alarm unit 30 and the transmitter unit 40 are still maintained alerted. Unless through the control of the remote controller, the security system will keep sending an audio alarm signal and a radio speech message until the power of the rechargeable battery 31;41 is low.

As stated above, when the burglar drives the car away, the transmitter unit 40 keeps sending the speech message by radio. The speech message is modulated by FM or AM so that it can be heard through a car radio of a car passing by. When a person hear the speech message, he (she) can then call the police, and telling the police about the stolen car.

Furthermore, the alarm unit 30 and the transmitter unit 40 are two separate units. The user can choice to install the alarm unit 30 or the transmitter unit 40, or to install both units in the security system.

It is to be understood that the drawings are designed for purposes of illustration only, and are not intended as a definition of the limits and scope of the invention disclosed.

What the invention claimed is:

1. A motor vehicle security system comprising a receiver unit, an alarm unit, and a transmitter unit respectively mounted in a motor vehicle and connected to a car battery of said motor vehicle, wherein said receiver unit is connected to said alarm unit and said transmitter unit by a power line, a control line and an earth line, and controlled to provide a check code to said alarm unit and said transmitter unit, said receiver unit been stopped from providing said check code when a door of the motor vehicle is opened by force; said alarm unit and said transmitter unit have a respective self-provided battery power supply and are triggered to produce an audio alarm signal and a radio alarm message respectively when receive no check code from said receiver unit, said radio alarm message being receivable to car radios.

2. The motor vehicle security system of claim 1, wherein said receiver unit comprises:

a receiver circuit adapted to receive a control signal of a remote controller and to provide a corresponding signal output;

a central processing unit adapted to transmit the output signal of said receiver circuit to a decoder, and to provide a check code to an encoder;

a decoder adapted to decode the output signal of said receiver circuit and then feed back the decoded control signal to said central processing unit, causing said central processing unit CPU to control the operation of car door switches of the motor vehicle, said decoder providing a signal output to a driver when it receives no signal from said receiver circuit within a predetermined length of time;

an encoder adapted to encode the check code provided by said central processing unit, and to transmit the encoded check code to said alarm unit and said transmitter unit; and a driver controlled by said decoder to drive said alarm unit and said transmitter unit.

3. The motor vehicle security system of claim 1, wherein said alarm unit comprises:

a central processing unit adapted to detect the check code of said receiver unit and to provide a control signal to a driver upon an interruption of the transmission of the check code;

a rechargeable battery adapted to provide said alarm unit with the necessary working voltage when the car battery of said motor vehicle provides no power output to said alarm unit;

a charging loop adapted to receive the power of the car battery of said motor vehicle through said receiver unit, said charging loop comprising a relay, said relay being at a normal close status when the power of the car battery of said motor vehicle is transmitting to said alarm unit, said relay being turned from said normal close status to a normal open status, permitting said rechargeable battery to provide the necessary working voltage to said driver when said alarm unit receives no power supply from the car battery of said motor vehicle;

a speaker; and a driver adapted to produce an audio alarm signal through said speaker when said central processing unit receives no check signal from said receiver unit.

4. The motor vehicle security system of claim 1, wherein said transmitter unit comprises:

a central processing unit adapted to detect the check code of said receiver unit and to provide a control signal to a driver upon an interruption of the transmission of the check code, said central processing unit comprising a memory, and a programming line through which a speech message is programmed in said memory, said central processing unit fetching the speech message from said memory when it receives no check code from said receiver unit, permitting the fetched speech message to be modulated into a radio signal by a transmitter circuit for transmitting into the air;

a rechargeable battery adapted to provide said transmitter unit with the necessary working voltage when the car battery of said motor vehicle provides no power output to said transmitter unit;

a transmitter circuit controlled by said central processing unit to provide a speech message by radio; and a charging loop adapted to receive the power of the car battery of said motor vehicle through said receiver unit for charging said rechargeable battery, and to let said rechargeable battery provide said transmitter unit with the necessary working voltage when it receives no power output from the car battery of said motor vehicle.

5. The motor vehicle security system of claim 4, wherein said memory is an electronically erasable programmable read only memory.

* * * * *